(12) United States Patent
Maguire

(10) Patent No.: US 9,174,522 B2
(45) Date of Patent: Nov. 3, 2015

(54) HYBRID POWERTRAIN WITH INPUT BRAKE

(75) Inventor: Joel M. Maguire, Northville, MI (US)

(73) Assignee: GM Global Technology Operations LLC, Detroit, MI (US)

(*) Notice: Subject to any disclaimer, the term of this patent is extended or adjusted under 35 U.S.C. 154(b) by 677 days.

(21) Appl. No.: 13/550,659

(22) Filed: Jul. 17, 2012

(65) Prior Publication Data

US 2014/0024493 A1 Jan. 23, 2014

(51) Int. Cl.
| | |
|---|---|
| *B60W 10/08* | (2006.01) |
| *B60K 6/22* | (2007.10) |
| *B60K 25/02* | (2006.01) |
| *B60K 6/20* | (2007.10) |
| *B60K 6/365* | (2007.10) |
| *B60K 6/38* | (2007.10) |
| *B60W 20/00* | (2006.01) |

(52) U.S. Cl.
CPC ... *B60K 6/22* (2013.01); *B60K 6/20* (2013.01); *B60K 6/365* (2013.01); *B60K 6/38* (2013.01); *B60K 25/02* (2013.01); *B60W 10/08* (2013.01); *B60W 20/00* (2013.01); *Y02T 10/92* (2013.01); *Y10T 477/24* (2015.01)

(58) Field of Classification Search
CPC .............. B66D 3/10; B66D 5/00; B60K 6/10
See application file for complete search history.

(56) References Cited

U.S. PATENT DOCUMENTS

| | | | |
|---|---|---|---|
| 7,415,905 B2* | 8/2008 | Maguire et al. | 74/339 |
| 8,028,788 B2* | 10/2011 | Stilwell et al. | 180/370 |
| 8,281,914 B2* | 10/2012 | Wians et al. | 192/14 |
| 8,347,992 B2* | 1/2013 | Gecim et al. | 180/65.265 |
| 9,005,064 B2* | 4/2015 | Yamamoto et al. | 475/159 |
| 2005/0109564 A1* | 5/2005 | Bai et al. | 188/71.1 |
| 2013/0035187 A1* | 2/2013 | Gebhard et al. | 475/5 |

* cited by examiner

*Primary Examiner* — Derek D Knight
(74) *Attorney, Agent, or Firm* — Quinn Law Group, PLLC

(57) ABSTRACT

A hybrid powertrain includes a hybrid transmission that has an input member operatively connectable to an engine crankshaft, at least one motor/generator, a gearing arrangement, and an output member operatively connectable to both the input member and said at least one motor/generator. An input brake has a first and a second brake shoe, a selectively energizable solenoid, and a mechanical biasing mechanism. The solenoid is operatively connected to the brake shoes via the mechanical biasing mechanism so that both brake shoes are operatively connected with the input member when the solenoid is energized. When the solenoid is deenergized, the first brake shoe remains operatively connected with and resists rotation of the input member when clockwise torque is applied to the input member and the second brake shoe remains operatively connected with and resists rotation of the input member when counterclockwise torque is applied to the input member.

9 Claims, 3 Drawing Sheets

HYBRID POWERTRAIN WITH INPUT BRAKE

TECHNICAL FIELD

The present teachings generally include hybrid powertrain with an input brake.

BACKGROUND

Hybrid powertrains may improve vehicle fuel economy in a variety of ways. For instance, in some hybrid powertrains, the engine may be turned off at idle, during periods of deceleration and braking, and during periods of low speed or light load operation to eliminate efficiency losses due to engine drag. Tractive torque for propulsion is provided only by one or more motor/generators in an electric-only operating mode. The motor/generators are able to capture vehicle kinetic energy during braking, which is used to keep the engine off longer, supplement engine torque or power and/or operate at a lower engine speed, or supplement accessory power supplies. Additionally, the motor/generators are very efficient in accessory power generation and electric power from the battery serves as an available torque reserve allowing operation at a relatively low transmission numerical speed ratio. The hybrid powertrain must be designed to perform when vehicle operating conditions require high output torque. Relying on torque from the motor/generators to do so may necessitate the use of relatively large motor/generators and/or a large energy storage device.

SUMMARY

A hybrid powertrain includes an engine with a crankshaft, and a hybrid transmission. The hybrid transmission has an input member operatively connectable to the crankshaft to be rotatable by the crankshaft, at least one motor/generator, a gearing arrangement, and an output member operatively connectable to both the input member and said at least one motor/generator via the gearing arrangement.

The hybrid transmission also includes an input brake that includes a first and a second brake shoe, a selectively energizable solenoid, and a mechanical biasing mechanism. The solenoid is operatively connected to the brake shoes via the mechanical biasing mechanism so that both brake shoes are operatively connected with the input member when the solenoid is energized. The mechanical biasing mechanism and the brake shoes are configured so that when the solenoid is deenergized, the first brake shoe remains operatively connected with and resists rotation of the input member when clockwise torque is applied to the input member and the second brake shoe remains operatively connected with and resists rotation of the input member when counterclockwise torque is applied to the input member.

The above features and advantages and other features and advantages of the present teachings are readily apparent from the following detailed description of the best modes for carrying out the present teachings when taken in connection with the accompanying drawings.

DETAILED DESCRIPTION

Figure 1:
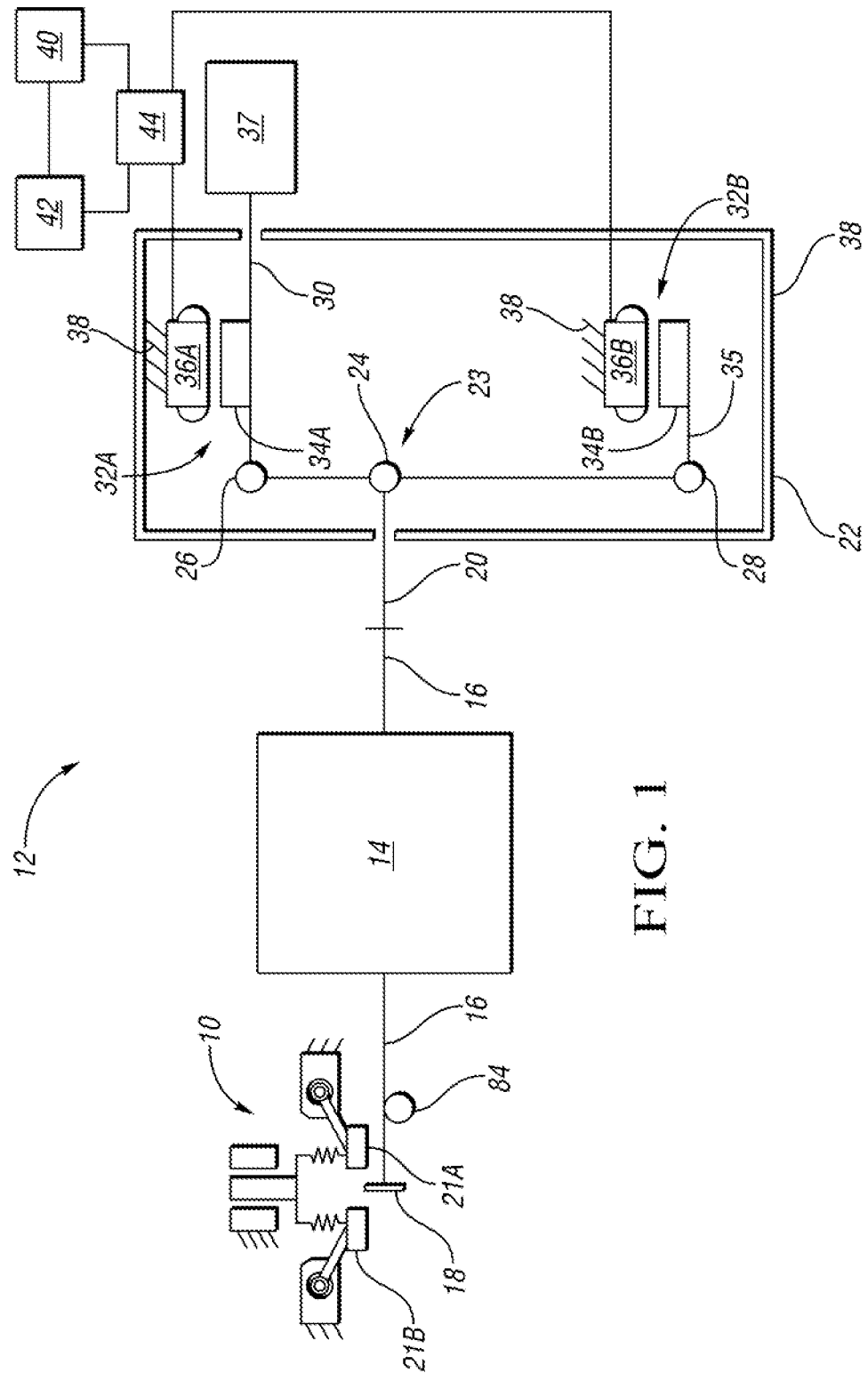
FIG. 1 is a schematic illustration in side view of one embodiment of a hybrid powertrain that has an input brake shown rotated in FIG. 1.
Figure 2:
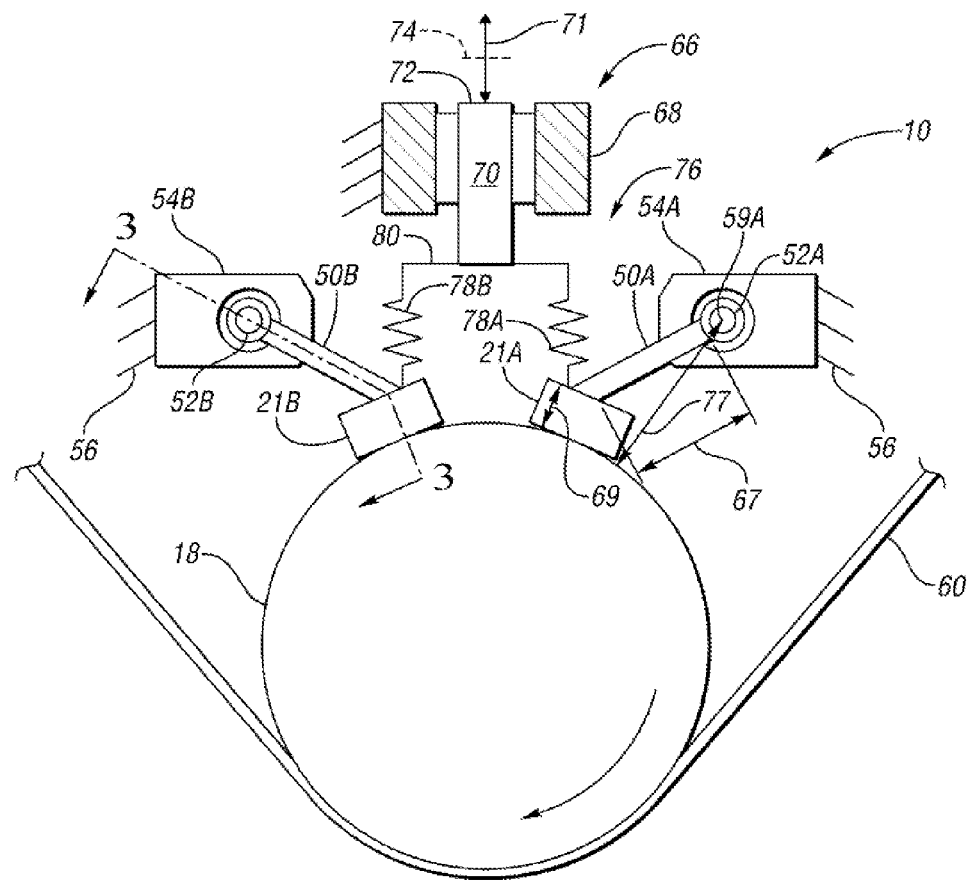
FIG. 2 is a schematic illustration in fragmentary end view of the input brake applied to a crankshaft pulley of the powertrain of FIG. 1.

Referring to the drawings, wherein like reference numbers refer to like components throughout the several views, FIG. 1 shows an input brake 10 included in one embodiment of a hybrid powertrain 12. Specifically, the hybrid powertrain 12 has an engine 14 with a crankshaft 16 and a rotatable member, such as a pulley 18, mounted on the crankshaft 16 to rotate commonly with the crankshaft 16. As used herein, "common rotation" or "connected for common rotation" means connected to rotate at the same speed, including a speed of zero. The crankshaft 16 is operatively connected to rotate with an input member 20 of the hybrid transmission 22 through a torque-bearing connection, such as a damping mechanism, a torque converter, or a direct connection. As such, the pulley 18 is operatively connected to rotate with the input member 20. For purposes of clarity in the drawings, the input brake 10 is shown rotated 90 degrees in FIG. 1 from its true orientation relative to the pulley, as shown in FIG. 2, in which first and second brake shoes 21A, 21B are positioned to resist rotation of the pulley 18 as further explained herein.

The hybrid transmission 22 is a power-split hybrid transmission that includes a planetary gearing arrangement 23 having a first member 24, a second member 26, and a third member 28. The first member 24, the second member 26, and the third member 28 include a sun gear member, a carrier member, and a ring gear member, although not necessarily in that order. The planetary gearing arrangement 23 is shown in lever diagram form, as is understood by a person skilled in the art.

An output member 30 is connected to rotate commonly with the second member 26. As used herein, components that "rotate commonly" and are "connected for common rotation" rotate at the same speed, including a speed of zero (i.e., stationary). A first motor/generator 32A includes a rotor 34A that is connected to rotate at the same speed as the output member 30. The output member 30 is connected to additional gearing 37, which may be a remaining portion of the transmission 22 or may be a final drive connected to vehicle wheels. The first motor/generator 32A includes a stator 36A grounded to a stationary member 38, such as a transmission casing 38.

A second motor/generator 32B is operatively connected for common rotation with the third member 28. The second motor/generator 32B includes a rotor 34B that is connected via a rotor hub 35 to rotate at the same speed as the third member 28. The second motor/generator 32B includes a stator 36B grounded to the stationary member 38.

An electronic controller 40 is operatively connected to the stators 36A, 36B to separately control each of the the motor/generators 32A, 32B to function as a motor or as a generator. The controller 40 includes electronics such as a processor on which a control algorithm is stored. An energy storage device 42, such as a battery or a battery module, stores energy that can be converted into electrical power by a power inverter 44 and provided to either or both of the stators 36A, 36B to power the motor/generators 32A, 32B to function as motors. The power inverter 44 can convert direct current provided by the energy storage device 42 into alternating current required by the stators 36A, 36B when the motor/generators 32A, 32B function as motors. When the controller 40 controls either of the motor/generators 32A, 32B to function as generators, the power inverter 44 will convert alternating current provided by the stator 36A or 36B into direct current to be stored as energy in the energy storage device 42. The controller 40 can also direct the inverter 44 to send alternating current from one of the motor/generators 32A, 32B that is functioning as a generator directly to the other motor/generator 32A or 32B that is functioning as a motor. Alternatively, each of the motor/generators 32A, 32B can include separate controllers and inverters packaged as a motor power inverter module mounted directly on each motor/generator 32A, 32B.

Because the motor/generators 32A, 32B and the input member 20 are each connected to different members 24, 26, 28 of the planetary gearing arrangement 23, the hybrid transmission 22 is a power-split transmission. That is, the torque provided by the engine 14 can be split through the planetary gearing arrangement 23 into a mechanical power path to the output member 30 and an electrical power path to one of the motor/generators 32A, 32B functioning as a generator. The transmission 22 and gearing arrangement 23 are shown by way of nonlimiting example only. Other power-split arrangements can be used within the scope of the present teachings. For example, the transmission 22 may be configured so that the gearing arrangement 23 and gearing 37 are a single mode or a multi-mode power-split transmission.

Figure 3:
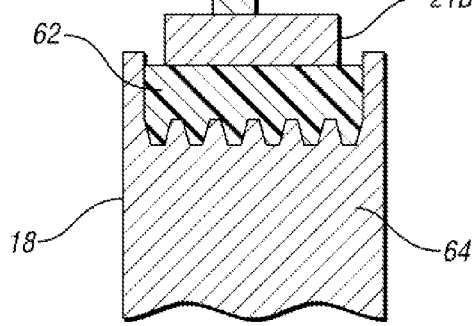
FIG. 3 is a schematic illustration in fragmentary cross-sectional view of the input brake of FIG. 2 taken at lines 3-3 in FIG. 2.

FIG. 2 shows the input brake 10 in greater detail. Specifically, the first and second brake shoes 21A, 21B are connected to respective pivot arms 50A, 50B. The pivot arm 50A has an end connected to a pivot rod 52A that is captured in a base 54A that is grounded to a stationary member 56, such as a brake housing. As shown in FIGS. 2 and 3, the pivot arm 50B has an end connected to a pivot rod 52B that is captured in a base 54B that is grounded to the stationary member 56. The pivot arms 52A, 52B are rotatable about their longitudinal axes relative to the bases 54A, 54B, allowing the brake shoes 21A, 21B to move toward and away from the pulley 18 as the pivot arms 50A, 50B pivot. The longitudinal axis 59B of pivot arm 52B is shown in FIG. 3, and pivot arm 52A has a similar longitudinal axis 59A indicated in FIG. 2. The pivot arms 50A, 50B are arranged to extend from the bases 54A, 54B so that the pivot arm 50A pivots counterclockwise toward the pulley 18 and the pivot arm 50B pivots clockwise toward the pulley 18. The pulley 18 can be part of an accessory drive system that includes an accessory belt 60 driven by the pulley 18 to drive vehicle accessories (not shown) operatively connected to the belt 60. FIG. 3 shows that the pulley 18 may include belt material 62 connected around a circumference of a base 64 of the pulley 18 and against which the brake shoes 21A, 21B contact and engage the pulley 18. The brake shoes 21A, 21B may include a pad of friction material that contacts the pulley 18, although not shown in FIGS. 1-3.

The input brake 10 has a selectively energizable solenoid 66 that includes an energizable annular coil 68 and an armature 70 configured to move due to electromagnetic flux created when the coil 68 is energized. The coil 68 is energizable by electrical current that may be supplied to the coil 68 from the energy storage device 42 under the control of the controller 40, or from another electric power source. The armature 70 moves linearly through a center of the annular coil 68 between the energized position shown in FIG. 2, to a deenergized position in which an upper extremity 72 of the armature 70 moves to position 74. Linear movement of the armature 70 is in a direction along the double-sided arrow 71.

The input brake 10 also includes a mechanical biasing mechanism 76 that includes a pair of compression springs 78A, 78B. The springs 78A, 78B are connected at one end to a base 80 that moves with an end of the armature 70. Spring 78A is connected at another end to the brake shoe 21A, and spring 78B is connected at another end to the brake shoe 21B. The solenoid 66 is thus operatively connected to the brake shoes 21A, 21B via the compression springs 78A, 78B so that both brake shoes 21A, 21B are biased against the pulley 18 when the solenoid 66 is energized to place the armature 70 in the position of FIG. 2. The springs 78A, 78B are compressed between the base 80 and the brake shoes 21A, 21B when the solenoid 66 is energized and thereby force the brake shoes 21A, 21B against the belt material 62 of the pulley 18. Because the pulley 18 is connected for rotation with the crankshaft 16, the brake shoes 21A, 21B are operatively connected with the input member 20 when the solenoid 66 is energized.

Preferably, the solenoid 66 is energized when the speed of rotation of the pulley 18, and thus the speed of rotation of crankshaft 16 and the input member 20, is at or near zero. In this way, the input brake 10 is able to hold the first member 24 stationary. FIG. 1 shows that a rotational speed sensor 84 can be mounted on the crankshaft 16 to provide a sensor signal indicative of a speed of the input member 20. The controller 40 or a different controller is operatively connected to the rotational speed sensor 84 and the solenoid 66. The controller 40, or the different controller, is configured to receive the sensor signal and provide a control signal to energize the coil 68 of the solenoid 66 when the sensor signal indicates that the speed of rotation of the crankshaft 16, and thus of the input member 20, is less than a predetermined speed. The predetermined speed can be a speed very close to zero or can be zero. For example, the solenoid 66 can be energized when an electric-only operating mode is to be implemented in the powertrain 12. In the electric-only operating mode, with the engine 14 off, it is desirable to hold the first member 24 of the planetary gearing arrangement 23 stationary so that both motor/generators 32A, 32B can be controlled to operate as motors to provide tractive torque at the output member 30. With the first member 24 held stationary via the input brake 10, the second motor/generator 32B can provide torque through the gearing arrangement 23 at the second member 26 and thereby at the output member 30. Without the ability to the hold the second member 24 stationary, the second motor/generator 32B would not be able to contribute tractive torque. The input brake 10 enables the motor/generators 32A, 32B and power electronics (controller 40 and inverter 44) to be smaller than would otherwise be necessary, for example, if only one motor/generator were able to contribute torque at the output member 30.

When the solenoid 66 is deenergized, that is, when electrical current flowing to the coil 68 is stopped, the magnetic flux acting on the armature 70 is thus removed, and the armature 70 returns to the deenergized position, causing the springs 78A, 78B to be relatively slack between the armature 70 and the brake shoes 21A, 21B. The springs 78A, 78B and the armature 70 are configured so that, when the solenoid 66 is deenergized, the brake shoes 21A, 21B remain in contact with the stationary pulley 18 and are therefore operatively connected with the input member 20. The first brake shoe 21A resists rotation of the input member 20 when clockwise torque is applied to the input member 20. The orientation of the pivot arm 50A and the brake shoe 21A extending toward the pulley 18 is such that rotation of the pulley 18 in a clockwise direction would tend to extend the spring 78A and forcibly wedge the pivot arm 50A between the base 54A and the pulley 18 rather than allowing the brake shoe 21A to lightly rest against the pulley 18. The sum of the axial length 67 of the pivot arm 50A and the height 69 of the brake shoe 21A is significantly greater than the shortest distance 77 from the pivot axis 59A to the outer circumference of the pulley 18. This allows the brake shoe 21A to resist clockwise rotation of the pulley 18 when a clockwise torque is applied to the pulley 18, such as by application of a clockwise torque to the input member 20. Because the spring 78B is slack when the solenoid 66 is deenergized, the second brake shoe 21B can freely ride along the circumference of the pulley 18, or may even be slightly raised from the pulley 18, when the pulley 18 rotates in a clockwise direction.

However, when counterclockwise torque is applied to the pulley 18 and therefore to the input member 20, the second brake shoe 21 B will resist rotation of the pulley 18. Similar to the first brake shoe 21A and the pivot arm 50A, the sum of the height of the second brake shoe 21B and the length of the pivot arm 50B is greater than the shortest distance between the pivot axis 59B of the pivot rod 52B and the outer surface of the pulley 18. Rather than lightly resting against the pulley 18, the second brake shoe 21B tends to be forcibly wedged against the pulley 18 if a counterclockwise torque is applied to the pulley 18 and therefore to the input member 20. The first brake shoe 21A will tend to ride along the pulley 18 or may even be raised up from the pulley 18 when counterclockwise torque is applied.

The brake shoes 21A, 21B are shown in FIG. 2 as being rigidly fixed on the arms 50A, 50B, respectively. Brake shoe 21B is also shown in FIG. 3 rigidly fixed to arm 50B. Alternatively, the connection of the brake shoe 21A to arm 50A could be a pivotable connection, and the connection of the brake shoe 21B to arm 50B could be a pivotable connection. A rigid, fixed connection of the brake shoes 21A, 21B to the arms 50A, 50B may be preferred, as a pivotable connection would need to be carefully constructed to prevent the potential for undue wear and misalignment of the brake shoes 21A, 21B.

When the powertrain 12 is to be operated in a mode in which the input brake 10 is not to be applied to the pulley 18, the brake shoes 21A, 21B can be released from contact with the pulley 18 by dithering the pulley 18 either by dithering the crankshaft 16 via the engine 14 or via the motor/generator 32A or the motor/generator 32B. As used herein, "dithering" is the alternating application of clockwise and counterclockwise torque in quick succession, causing the brake shoes 21A, 21B to be bumped outward and away from the pulley 18.

The input brake 10 has very low energy losses because it is self-energizing by the designed interference of the brake shoes 21A, 21B with clockwise and counterclockwise rotation of the pulley 18, respectively, once it is initially applied and the solenoid 66 is deenergized. The interference of the brake shoes 21A, 21B with the pulley 18 provides a robust resistance to rotation.

Figure 4:
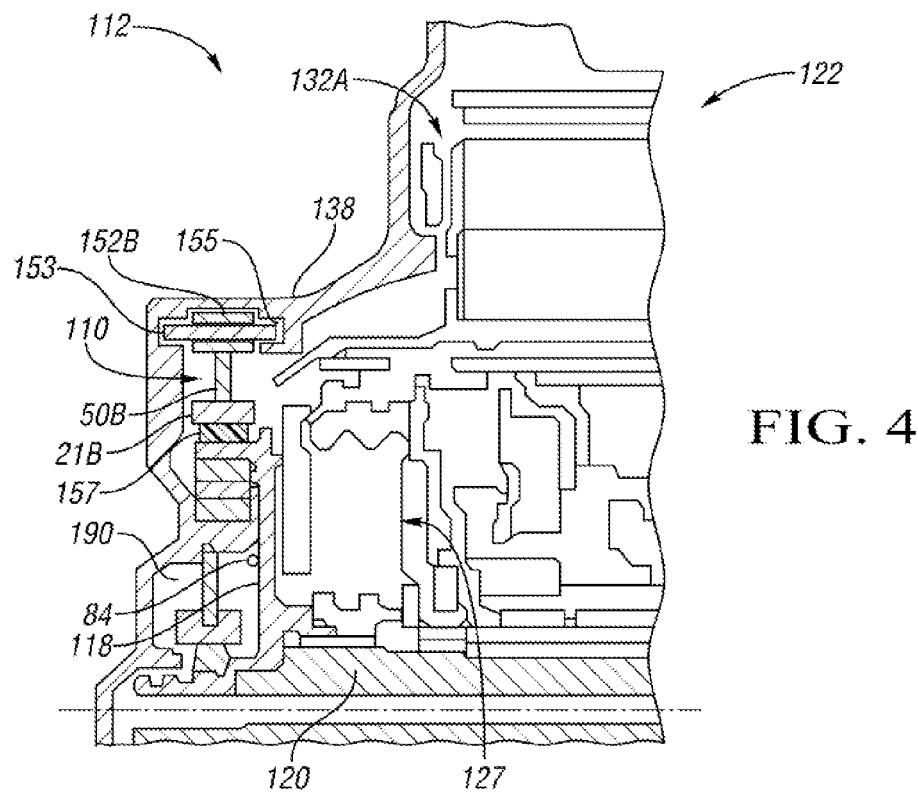
FIG. 4 is a schematic illustration in fragmentary cross-sectional view of the input brake of FIG. 1 within a transmission casing and applied to a hub connected for rotation with an input member of an alternative hybrid powertrain in an alternative aspect of the present teachings.

FIG. 4 shows another embodiment of a powertrain 112 in which an input brake 110 is packaged within a transmission casing 138 of a transmission 122. The transmission casing 138 defines an interior cavity 190 in which one or more motor/generators, such as motor/generator 132A, and a gearing arrangement 127, are packaged. An input member 120 that is driven by an engine crankshaft, such as crankshaft 16 in FIG. 1, extends through the casing 138. A rotational speed sensor 84 similar to that of FIG. 1 can be mounted to the input member 120 or the hub 118. The engine and crankshaft may be at an opposing end of the transmission 112, so that the input brake 110 is packaged at the rear of the transmission 112. The input brake 110 can engage a rotatable member, which in this embodiment is a hub 118 splined to and connected for common rotation with the input member 120. Although not shown in FIG. 4, a controller 40, inverter 44, and energy storage device 42 are connected to the motor/generator 132A, and the input brake 110 is connected to a same or a different controller 40 and energy storage device 42.

The input brake 110 is identical to input brake 10 described with respect to FIGS. 1-3, except that the pivot arms 50A, 50B each have a central opening through which a pin 153 extends and the pins are mounted to the transmission casing 138. FIG. 4 shows one of the pivot arms 50B connected to a pivot rod 152B that has an opening through which a pin 153 extends. The pin 153 and pivot rod 152B are captured in a cavity 155 provided in the transmission casing 138. Only one of the brake shoes 21B and one of the pivot arms 50B are visible in FIG. 4. However, both are packaged similarly within the transmission casing 138, so that they extend toward the rotatable hub 118 to be in contact with an outer surface of the hub 118 similar to the arrangement relative to the pulley 18 in FIG. 2. The brake shoe 21B includes a braking pad 157 of a high friction material that contacts the hub 118.

Figure 5:
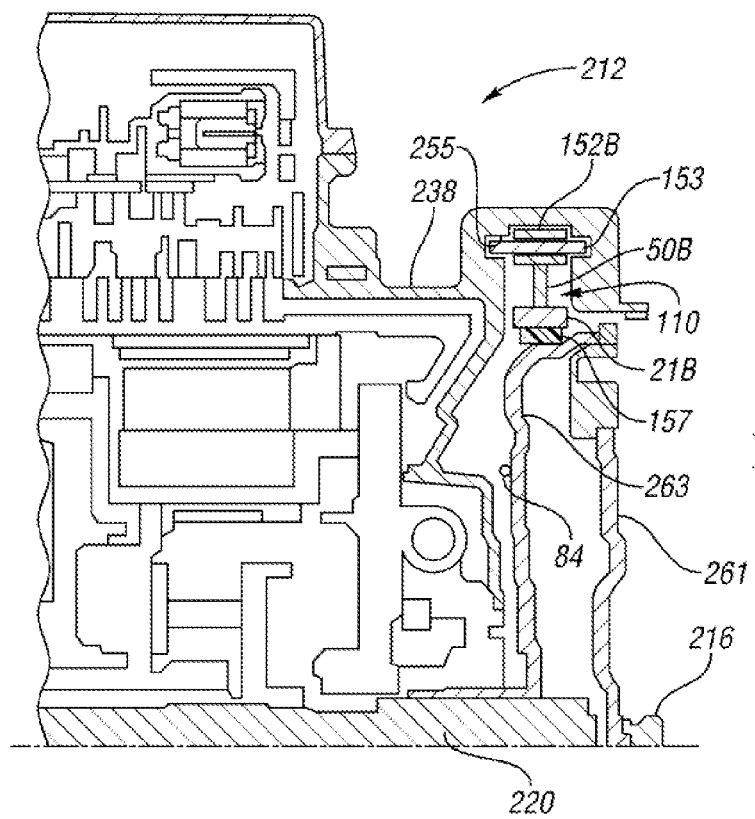
FIG. 5 is a schematic illustration in fragmentary cross-sectional view of the input brake of FIG. 1 within a transmission casing and applied to a transmission input plate that is connected for rotation with an input member and with a flexplate of an alternative hybrid powertrain in an alternative aspect of the present teachings.

FIG. 5 shows another embodiment of a powertrain 212. The powertrain 212 includes a flexplate 261 that is configured to rotate with an engine crankshaft 216, shown only partially. The remainder of the engine is not shown. A transmission input plate 263 is rigidly connected to the flexplate 261 through rivets, bolts, fasteners, or otherwise, to rotate commonly with the flexplate 261, and is operatively connected to rotate with a transmission input member 220 that extends within the transmission casing 238. A rotational speed sensor 84 similar to that of FIG. 1 can be mounted to the flexplate 261, the transmission input plate 263, or the input member 220. The input brake 110 described with respect to FIG. 4 is packaged within the transmission casing 238, with the pin 153 supported in a cavity 255 provided in the casing 238. Only one of the brake shoes 21B and one of the pivot arms 50B are visible in FIG. 5. However, both are packaged similarly within the transmission casing 238, so that they extend toward the transmission input plate 263 to be in contact with an outer surface of the transmission input plate 263 similar to the arrangement relative to the pulley 18 in FIG. 2.

Accordingly, a method of controlling a hybrid powertrain is provided. The method is described with respect to the powertrain 12 of FIGS. 1-3, but can equally apply to the powertrains 112 and 212 of FIGS. 4 and 5. The method can include determining when a rotational speed of a rotatable member, pulley 18, operatively connected for rotation with an input member 20 is less than a predetermined speed. The rotational speed sensor 84 is used to determine the speed of rotation as discussed with respect to FIG. 1.

The method then includes energizing a solenoid 66 to mechanically bias first and second brake shoes 21A, 21B into contact with the rotatable member, pulley 18, when the rotational speed is less than the predetermined speed. After the brake shoes 21A, 21B are in contact with the rotatable member 18, the solenoid 66 is deenergized. As described above, the first brake shoe 21A is configured to remain in contact with and provide resistance to clockwise rotation of the pulley 18 when the solenoid 66 is deenergized and clockwise torque is applied to the input member 20, and the second brake shoe 21B is configured to remain in contact with and provide resistance to counterclockwise rotation of the pulley 18 when the solenoid 66 is deenergized and counterclockwise torque is applied to the input member 20.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A hybrid powertrain comprising:
    an engine with a crankshaft;
    a hybrid transmission having:
        an input member operatively connectable to the crankshaft to be rotatable by the crankshaft;
        at least one motor/generator;
        a gearing arrangement;
        an output member operatively connectable to both the input member and said at least one motor/generator via the gearing arrangement;
    an input brake comprising:
        a first and a second brake shoe;
        a selectively energizable solenoid;
        a mechanical biasing mechanism; wherein the solenoid is operatively connected to the brake shoes via the mechanical biasing mechanism so that both brake shoes are operatively connected with the input member when the solenoid is energized; and
        wherein the mechanical biasing mechanism and the brake shoes are configured so that when the solenoid is deenergized, the first brake shoe remains operatively connected with and resists rotation of the input member when clockwise torque is applied to the input member, and the second brake shoe remains operatively connected with and resists rotation of the input member when counterclockwise torque is applied to the input member.

2. The hybrid powertrain of claim 1, wherein the solenoid includes an armature; wherein the mechanical biasing mechanism includes a first spring and a second spring biased by the armature against the first and the second brake shoes, respectively, when the solenoid is energized.

3. The hybrid powertrain of claim 2, wherein the first and second brake shoes are configured to be released from operative connection with the input member when the solenoid is deenergized and the input member is dithered.

4. The hybrid powertrain of claim 1, further comprising:
    a rotatable member operatively connected to and configured to rotate with the input member; and
    wherein the first and the second brake shoes are biased into contact with the rotatable member when the solenoid is energized.

5. The hybrid powertrain of claim 4, wherein the rotatable member is a crankshaft pulley.

6. The hybrid powertrain of claim 4, wherein the rotatable member is a hub operatively connected with the input member;
    wherein the transmission has a transmission casing; and
    wherein the engine is adjacent one axial end of the transmission casing and the input brake is pivotably connected to the transmission casing and within the transmission casing at another axial end of the transmission casing.

7. The hybrid powertrain of claim 4, further comprising:
    a flexplate configured to rotate with the crankshaft;
    wherein the rotatable member is a transmission input plate connected to the flexplate to rotate with the flexplate and operatively connected with the input member;
    wherein the transmission has a transmission casing; and
    wherein the input brake is pivotably connected to the transmission casing within the transmission casing.

8. The hybrid powertrain of claim 4, wherein the transmission is a power-split hybrid transmission; wherein the gearing arrangement is a planetary gearing arrangement having a first member, a second member, and a third member; wherein the input member is connected for common rotation with the first member
    wherein said at least one motor/generator includes:
        a first motor/generator that rotates commonly with the second member; and
        a second motor/generator operatively connected for common rotation with the third member;
    wherein the output member is operatively connected for common rotation with the second member and wherein the input brake holds the input member stationary and both of the motor/generators function as motors to provide a two-motor electric-only operating mode.

9. The hybrid powertrain of claim 1, further comprising:
    a rotational speed sensor operatively connected to the input member and configured to provide a sensor signal indicative of a speed of the input member;
    a controller operatively connected to the rotational speed sensor and the solenoid; and
    wherein the controller is configured to receive the sensor signal and provide a control signal to energize the solenoid when the sensor signal indicates that the speed of rotation of the input member is less than a predetermined speed.

* * * * *